(No Model.)
J. D. WILKENS.
DENTAL HANDPIECE.
No. 533,575. Patented Feb. 5, 1895.
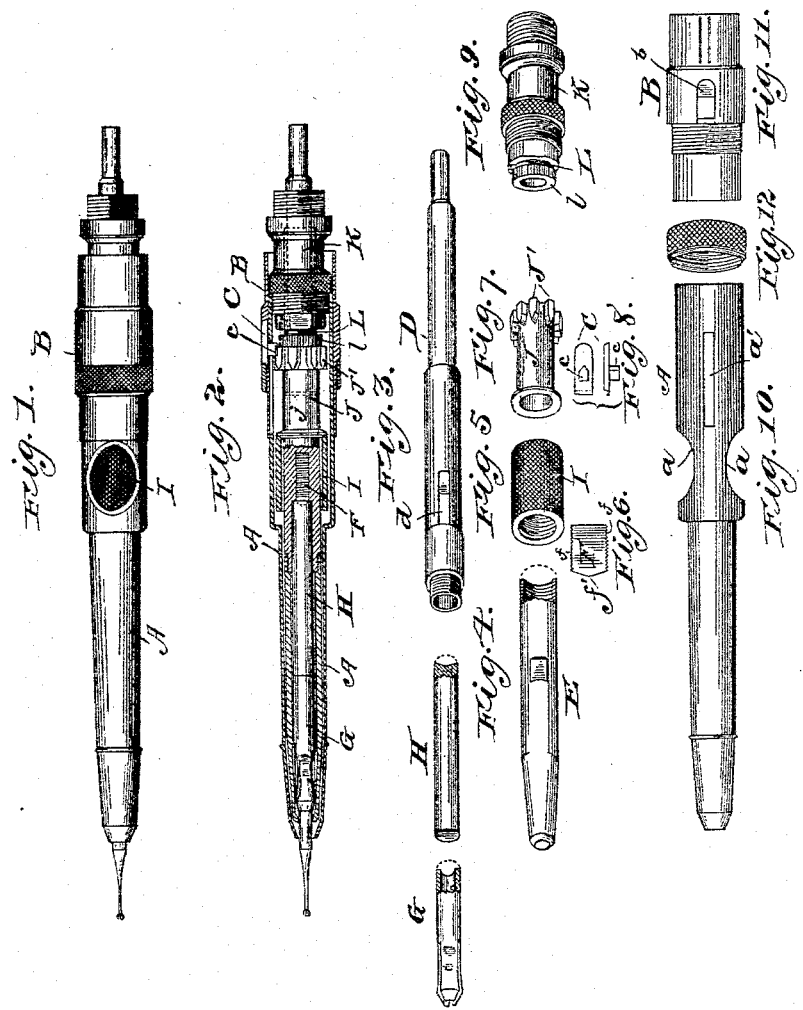
Witnesses.
Inventor,
John D. Wilkens
By Offield, Towle & Linthicum
Attys.

UNITED STATES PATENT OFFICE.

JOHN D. WILKENS, OF CHICAGO, ILLINOIS, ASSIGNOR TO JOHN N. CROUSE, OF SAME PLACE.

DENTAL HANDPIECE.

SPECIFICATION forming part of Letters Patent No. 533,575, dated February 5, 1895.

Application filed February 1, 1894. Serial No. 498,789. (No model.)

*To all whom it may concern:*

Be it known that I, JOHN D. WILKENS, of Chicago, Illinois, have invented certain new and useful Improvements in Dental Handpieces, of which the following is a specification.

This invention relates to a dental hand piece, having a rotating hollow spindle containing a sliding chuck and threaded nut for advancing and locking the chuck.

The invention consists in combining with said nut a threaded wedge mounted in the spindle so as to rotate therewith but capable of moving longitudinally thereof and impinging the chuck so as to move the latter and lock it.

In the accompanying drawings, Figure 1 is a plan view of the hand piece complete. Fig. 2 is a longitudinal section through the casing and part of the spindle, the remaining parts showing in elevation. Fig. 3 shows separate and detached views of the chuck, a chuck actuating rod and the rear section of a divided spindle. Fig. 4 shows the front section of the spindle; Fig. 5, the operating nut, and Fig. 6 the threaded wedge with which the nut cooperates. Fig. 7 is a perspective view of a sleeve clutch. Fig. 8 is an inverted plan view and side elevation, respectively, of a detent working with said clutch. Fig. 9 is a perspective view of a sheath collet and adjusting nut. Fig. 10 is a plan view of the external casing; Fig. 11, a similar view of a sliding sleeve, and Fig. 12 a perspective view of a locking collar for holding a detent in the sliding sleeve.

In the drawings, A represents a casing which has apertures $a$ in opposite points in its wall to afford access to the operating nut, and a longitudinal aperture or slot $a'$ through which a detent on the sliding sleeve B operates. Said sleeve has a depression or seat $b$ within which a removable detent C rests, and the seat is cut away at one point to permit a lug $c$ on the detent to enter the bore of the casing. Within this casing is rotatably mounted a divided spindle, the rear section of which, D, has its front end threaded for engagement with the front section E, and section D is adapted for connection with a flexible shaft or other driving mechanism. The spindle section D has a longitudinal slot or mortise $d$ within which is loosely fitted a threaded wedge F, said wedge having a flat body with threads $f$ on its opposite edges and its forward end or nose pointed, as seen at $f'$. Within the section E of the hollow spindle is slidably mounted the chuck G having the usual spring chuck jaws and between the wedge and the chuck is slidably mounted within the spindle the chuck actuating rod H. This rod is used for convenience only, as the chuck shank may be sufficiently long to project into contact with the nose of the wedge.

I represents an internally threaded tubular nut whose threads engage the threads of the wedge F, and whose surface is preferably milled so as to make the nut easily rotatable by the thumb and finger of the operator applied through the apertures $a$ of the casing.

J represents a tubular clutch which is secured to the spindle by the pin $j$, and this clutch has the peripheral teeth J' at its rear end, the front ends of these teeth being pointed. The lug $c$ of the detent C, carried by the sliding collar B, is adapted to enter between these teeth J', and thus hold the clutch and the spindle with which it is connected against rotation, while the operator moves the wedge F by means of the nut I. The sliding of the wedge F operates, through the rod H bearing on the end of the chuck shank, to close the chuck jaws, thus locking the tool; and the tool is released by turning the nut in the opposite direction.

K represents a sheath collet, which has threaded engagement with the sheath or casing A, and within the part K is mounted the spindle collet L, consisting of a threaded sleeve which is turned into corresponding internal threads in the sheath collet K, and carries the milled or knurled head $l$ by which it can be adjusted to compensate for wear.

The precise form of the threaded wedge is not essential, and said wedge may be used with other forms of chuck.

I claim—

1. In a dental hand piece, the combination with a casing, of a rotatable hollow spindle having a slot therein, a threaded wedge located in the slot, a threaded nut surrounding the spindle and engaging the wedge by its threads and a tool clamping device or chuck mounted within the hollow of the spindle and against which the wedge may be forced whereby to clamp the tool, substantially as described.

2. In a dental hand piece, the combination with a casing having apertures at opposite points in its side wall, a hollow spindle rotatably mounted in the casing and having a slotted aperture or mortise, a movable threaded wedge arranged in said mortise, a threaded nut sleeved over the spindle adjacent to the apertures in the sleeve and engaging the wedge, a tool clamp or chuck, and an actuating rod slidably mounted in the spindle, the rod being interposed between the chuck and the wedge and adapted to force the chuck into locking engagement with the tool when the wedge is operated, substantially as described.

JOHN D. WILKENS.

Witnesses:
C. C. LINTHICUM,
N. M. BOND.